Keen & Burgess.
App. for Evaporating & Calcining Alkaline Solutions.
No 46,244.   Patented Feb. 7, 1865.
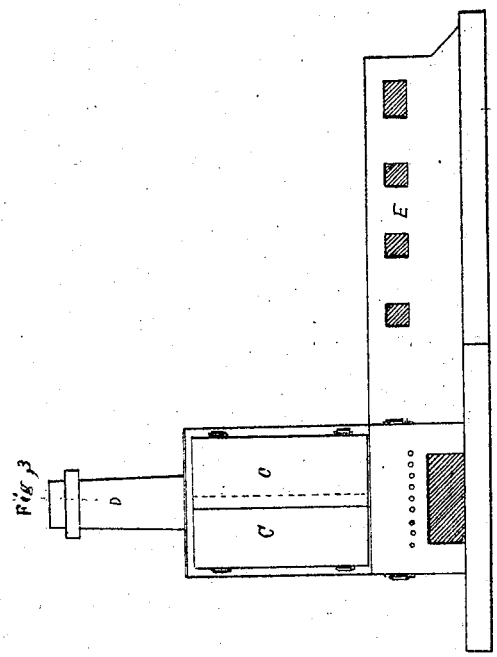
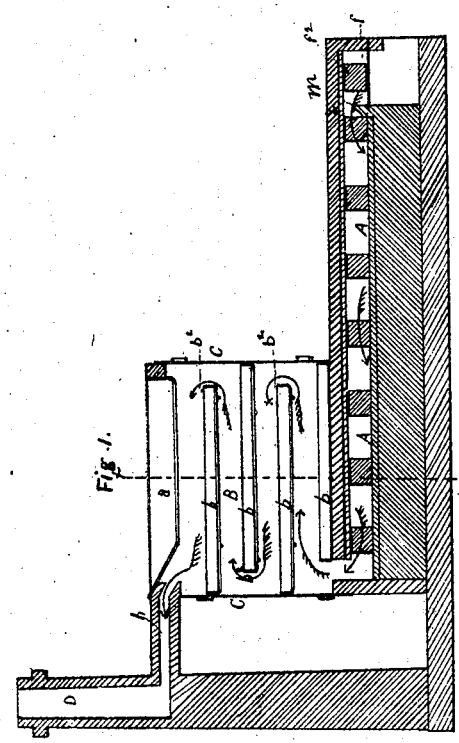
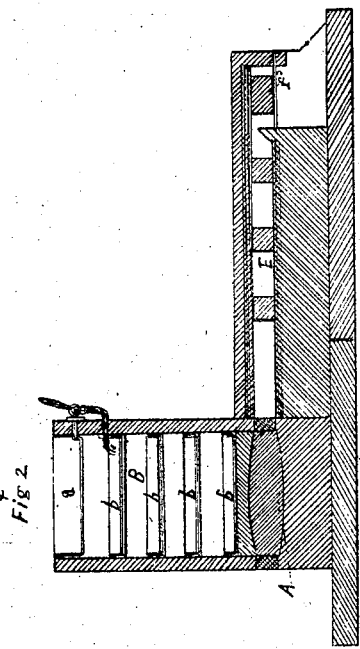

UNITED STATES PATENT OFFICE.

MORRIS L. KEEN AND HUGH BURGESS, OF ROYERSFORD, PENNSYLVANIA.

APPARATUS FOR EVAPORATING AND CALCINING ALKALINE SOLUTIONS.

Specification forming part of Letters Patent No. 46,244, dated February 7, 1865; Reissued January 30, 1877, No. 7,485.

*To all whom it may concern:*

Be it known that we, MORRIS L. KEEN and HUGH BURGESS, of Royersford, in the county of Montgomery and State of Pennsylvania, have invented certain new and useful Improvements in Furnaces for Evaporating Alkaline Solutions and Calcining the Same; and we do hereby declare the following to be a full, clear, and exact description of the construction and operation of the same, reference being had to the accompanying drawings, making a part of this specification, in which—

Figure 1, represents a longitudinal and vertical section taken through the body of the main furnace. Fig. 2, represents a vertical transverse section through the red line $x$, $x$, of Fig. 1, and showing also in section the calcining furnace connected thereto. Fig. 3 represents a front elevation of the evaporating furnace and a side view of the calcining furnace.

Similar letters of reference where they occur in the separate figures denote like parts in all the drawings.

In the process of pulping or disintegrating wood, straw, flax, and other similar fiber yielding substances, by the use of alkaline solutions, it is desirable to recover the alkali in such solutions, by evaporating down the liquors, in which the vegetable matters have been treated. For this purpose we make use of a furnace constructed in such a manner that the flame and hot gases from the fire, urged by a blast or strong draft, are passed over the surface of the liquid to be evaporated on the sole or hearth of the furnace, and utilizing the remainder of the unabsorbed heat by passing it over and under a series of pans through which flows the alkaline solution in its transit from the reservoir to the hearth. And we also use as an appendage to the evaporating furnace, or as separate therefrom, but forming a continuation of the process of recovering the alkali, a calcining furnace, which we will hereafter more particularly describe. And our invention consists, first, in so constructing a furnace, wherein the heat and gases from the fire pass over the liquid that is being evaporated on the sole or hearth thereof, that the unabsorbed heat shall pass over, and under a series of pans through which the solution flows to said hearth, before its final escape to the chimney or stack. And our invention further consists in combining with the main evaporating furnace, a finishing or calcining furnace or furnaces, for completing the restoration of the alkali, as will be explained.

To enable others skilled in the art to make and use our invention we will proceed to describe the same with reference to the drawings.

A, represents the main evaporating hearth, and B the pan-chamber closed at each end by iron doors C.

$a$ is a reservoir over the pan chamber, from whence by means of a cock or other controllable means, the solution to be evaporated is supplied to the pans $b$, in quantity proportionate to the evaporation to be effected. The alkaline solution flows from one pan to the next below it, by means of the overflows $b^2$, until it reaches the hearth A, where it is exposed to the action of the flame and gases from the fire which is at $f$. The fire is urged by a blast or strong draft which enters the ash pit at $f^2$. The course of the hot air and gases is indicated by the arrows, which show its passage over the surface of the solution on the hearth and under and over the pans, when it is passed out by the flue $h$, to the chimney or stack D. The alkaline solution after passing through the pans reaches the hearth more or less inspissated. The evaporation is partially or wholly completed on the hearth when the alkaline mass is ready for calcination. We prefer to effect this calcination in another furnace in which a lower degree of heat is maintained, to prevent loss by sublimation. The calcining furnace may be separate, or attached to the main evaporator as shown in Figs. 2 and 3, at E, and connected to the main evaporator at or near the bridge wall $m$. The calcining furnace E (or furnaces) may be constructed in every way similar to the hearth of the main evaporator A, and are provided with fires at their ends $f^3$, which are urged by a regulated blast or draft.

At the proper stage of inspissation of the solution, on the hearth of the main evaporator, the said solution is allowed to flow, or may be moved into the calcining furnace E, and there evaporated to dryness and calcined. The product of combustion of the vegetable matter in the alkaline mass passing over the hearth of the main evaporator is thus utilized. When two furnaces (E) are used, they may be used alternately, obviating the necessity of lowering the temperature of the main evaporator which is worked continuously.

It is obvious that the number, form, and mode of setting the pans may be altered to suit the circumstances of the case. Or, if it is deemed desirable, in the place of a series of pans the following may be adopted: A tower constructed of stone, brick or iron, may be filled with pieces of stone, brick, or other suitable material, down and over which, the alkaline solution is made to flow by any suitable arrangement on top of the tower, while the waste or excess of heat from the hearth of the furnace enters the tower at or near its base, and in its ascent is absorbed by the descending alkaline solution, which flows onto the hearth from the receiving tank.

Having thus described our invention, what we claim is—

1. A furnace constructed for the purpose of evaporating the alkaline solutions used in the pulping and disintegrating of vegetable substances, in which the heat is utilized by means of an arrangement of pans, or their equivalents substantially as, and for the purpose described.

2. We also claim in combination with the main evaporator the finishing or calcining furnace, or furnaces substantially as described.

MORRIS L. KEEN.
HUGH BURGESS.

Witnesses:
EDW. W. ATWATER,
JOHN RANDOLPH.

[FIRST PRINTED 1912.]